United States Patent
Chen

(10) Patent No.: US 11,158,064 B2
(45) Date of Patent: Oct. 26, 2021

(54) ROBOT MONITORING SYSTEM BASED ON HUMAN BODY INFORMATION

(71) Applicant: YUTOU TECHNOLOGY (HANGZHOU) CO., LTD., Hangzhou (CN)

(72) Inventor: Mingxiu Chen, Hangzhou (CN)

(73) Assignee: YOTOU TECHNOLOGY (HANGZHOU) CO., LTD., Zhejiang (CN)

(*) Notice: Subject to any disclaimer, the term of this patent is extended or adjusted under 35 U.S.C. 154(b) by 653 days.

(21) Appl. No.: 15/999,670

(22) PCT Filed: Feb. 20, 2017

(86) PCT No.: PCT/CN2017/074048
§ 371 (c)(1),
(2) Date: Aug. 20, 2018

(87) PCT Pub. No.: WO2017/143949
PCT Pub. Date: Aug. 31, 2017

(65) Prior Publication Data
US 2021/0209769 A1    Jul. 8, 2021

(30) Foreign Application Priority Data
Feb. 23, 2016    (CN) .......................... 201610099509.5

(51) Int. Cl.
*G06T 7/246*  (2017.01)
*G06T 7/254*  (2017.01)
(Continued)

(52) U.S. Cl.
CPC .......... *G06T 7/248* (2017.01); *G06K 9/00228* (2013.01); *G06K 9/00369* (2013.01);
(Continued)

(58) Field of Classification Search
None
See application file for complete search history.

(56) References Cited

U.S. PATENT DOCUMENTS 7,385,626 B2 * 6/2008 Aggarwal .......... G06K 9/00771
                                                                    348/143
9,741,129 B2 * 8/2017 Holtz ................. H04N 5/23203
(Continued)

FOREIGN PATENT DOCUMENTS

CN       101893894       11/2010
CN       102096927       6/2011
(Continued)

OTHER PUBLICATIONS

PCT/CN2017/074048, Search Report and Written Opinion dated Apr. 18, 2017, 6 pages—Chinese, 8 pages—English.

*Primary Examiner* — Vikkram Bali
(74) *Attorney, Agent, or Firm* — Andrew F. Young; Nolte Lackenbach Siegel

(57) ABSTRACT

The present invention falls within the technical field of robots, and particularly relates to a robot monitoring system. The robot monitoring system based on human body information comprises an image collection unit for collecting an image; a human body detection unit for determining whether human body information matching a training sample exists in the image; a target acquisition unit for acquiring position information and size information about the human body information in the image; a target tracking unit for acquiring a current motion region according to a frame difference between the image and a predetermined image frame and acquiring a moving target from the motion region; and an adjustment unit for adjusting the orientation of the image collection unit such that the moving target is located in the centre of the image. By means of the technical solution, human body information is detected to track a moving (Continued)

target, so that a monitoring centre always tracks the position of a human body, thereby effectively realizing human body positioning and tracking, so as to monitor content information of interest.

8 Claims, 2 Drawing Sheets

(51) Int. Cl.
  *G06T 7/70* (2017.01)
  *H04N 5/232* (2006.01)
  *G06K 9/00* (2006.01)
  *G06K 9/62* (2006.01)
  *H04N 7/18* (2006.01)

(52) U.S. Cl.
  CPC ............ *G06K 9/6201* (2013.01); *G06T 7/254* (2017.01); *G06T 7/70* (2017.01); *H04N 5/23299* (2018.08); *H04N 7/18* (2013.01); G06K 2209/21 (2013.01); G06T 2207/10016 (2013.01); G06T 2207/20081 (2013.01); G06T 2207/30201 (2013.01); G06T 2207/30232 (2013.01)

(56) References Cited

U.S. PATENT DOCUMENTS

| | | | |
|---|---|---|---|
| 2002/0030741 A1* | 3/2002 | Broemmelsiek | H04N 7/188 348/169 |
| 2010/0128126 A1* | 5/2010 | Takeuchi | H04N 7/188 348/143 |
| 2013/0155226 A1 | 6/2013 | Lee et al. | |
| 2016/0188977 A1* | 6/2016 | Kearns | G05D 1/0274 348/113 |

FOREIGN PATENT DOCUMENTS

| | | |
|---|---|---|
| CN | 102456225 | 5/2012 |
| CN | 104751483 | 7/2015 |

\* cited by examiner

ROBOT MONITORING SYSTEM BASED ON HUMAN BODY INFORMATION

CROSS-REFERENCE TO RELATED APPLICATIONS

The present application claims priority to and the benefit of Ser. No. PCT/CN2017/074048 filed Feb. 20, 2017, the entire contents of which are incorporated by reference, which in turn claims priority to and the benefit of Chinese Patent Application No. CN 201610099509.5 filed on Feb. 23, 2016, the entire content of which is incorporated herein by reference.

BACKGROUND OF THE INVENTION

1. Field of the Invention

The present invention relates to a technical field of the robot, more specifically, to a robot monitoring system.

2. Description of the Related Art

The current mainstream robot monitor mainly utilizes an image capture device for monitoring 24 hours a day in a single angle of view. However, in most scenes, a user is only interested in a part of monitoring contents containing effective information, and continuous monitoring comprises a lot of static ineffective monitoring records, which is not only inconvenient for the user to find required surveillance videos, but also contains excess static ineffective videos so as to occupy a lot of storage space. Furthermore, the monitoring information in a single angle of view cannot render a monitoring center to always follow contents information that users are interested in, so it will not meet the monitor requirements of users.

SUMMARY OF THE INVENTION

Aiming at the abovementioned technical problems, the invention provides a robot monitoring system based on human body information and a method thereof, to overcome the existing technical defects.

The technical solution of the invention is described as follows:

A robot monitoring system based on human body information, wherein it comprises:
an image capture unit, configured to capture images;
a human body detection unit, connected with the image capture unit, and configured to determine if any human body information in the images matches with human body information in a training sample;
a target acquisition unit, connected with the human body detection unit, and configured to get location information and size information of the human body information in the image;
a target tracking unit, connected with the image capture unit and the target acquisition unit, and configured to obtain a current motion zone according to a frame difference between predetermined image frames in the image, and to obtain a motion target in the motion zone;
an adjusting unit, connected with the target tracking unit and the image capture unit, and configured to adjust direction of the image capture unit so as to locate the motion target in a center of the image.

Preferably, in the robot monitoring system based on human body information, the target tracking unit comprises:
a frame difference calculating unit, configured to compute obtained image information of a (n+2)th frame, a (n−1)th frame and a (n)th frame, so as to obtain the frame difference between pixel gray scales of the (n−1)th frame and that of the (n+2)th frame as a first difference image and obtain the frame difference between pixel gray scales of the (n)th frame and that of a (n−2)th frame as a second difference image;
a motion image acquisition unit, connected with the frame difference calculating unit, and configured to obtain a current motion image according to the first difference image and the second difference image; a motion target acquisition unit, connected with the motion image acquisition unit, configured to obtain a set of points which meet setting conditions in the motion image, and to obtain the motion target according to the set of points.

Preferably, in the robot monitoring system based on human body information, the adjusting unit comprises: a judgment unit, configured to judge a distance between the motion target and a center of the image, so as to produce an adjusting signal if the distance is greater than a given threshold.

Preferably, the robot monitoring system based on human body information further comprises a storage unit, connected with the image capture unit, and configured to store the images.

Preferably, in the robot monitoring system based on human body information, the human body information is human face information.

The invention also provides a robot monitoring method based on human body information, wherein it comprises steps as follows:
S1: capture images;
S2: determine if any human body information in the images matches human body information in a training sample, if NO, repeat S1;
S3: obtain location information and size information of the human body information in the image;
S4: obtain a current motion zone according to a frame difference between predetermined image frames in the image, and obtain a motion target in the motion zone;
S5: adjust direction of the image capture unit so as to locate the motion targeted in a center of the image.

Preferably, in the robot monitoring method based on human body information, S4 includes:
S41: compute obtained image information of the (n+2)th frame, the (n−1)th frame and the (n)th frame, so as to obtain the frame difference between pixel gray scales of the (n−1)th frame and that of the (n+2)th frame as a first difference image and obtain a frame difference between pixel gray scales of the (n)th frame and that of the (n−2)th frame as a second difference image;
S42: obtain a current motion image according to the first difference image and the second difference image;
S43: obtain a set of points which meet setting conditions in the motion image, wherein each point represents a motion unit, and to find all interconnected motion units as suspected motion targets;
S44: compute motion intensity value of each suspected motion target, wherein the motion intensity value equals to the number of the motion units divided by the rectangular area of the suspected motion targets, and to obtain all the effective motion targets at current time point according to the motion intensity value and the rectangular area of the suspected motion targets;
S45: select a rectangle frame closest to the target object from the effective motion targets as the motion target.

Preferably, in the robot monitoring method based on human body information, the training sample is obtained by pre-training prior to S1.

Preferably, in the robot monitoring method based on human body information, when the steps from S1 to S4 loops for a certain period of time, a video, in a time period from the first time that YES occurs in S2 to the last time that NO occurs in S2, would will be selected and transmitted to a monitoring storage center.

Preferably, in the robot monitoring method based on human body information, the human body information is human face information.

The advantageous effects of the invention includes: the abovementioned technical solution uses detection of human body information to track the motion target, so that the monitoring center tracks the location of the human body all the time, locating and tracking human body are achieved effectively, for monitoring contents information that users are interested in.

BRIEF DESCRIPTIONS OF THE DRAWINGS

The accompanying drawings, together with the specification, illustrate exemplary embodiments of the present disclosure, and, together with the description, serve to explain the principles of the present invention.

DETAILED DESCRIPTIONS

Figure 1:
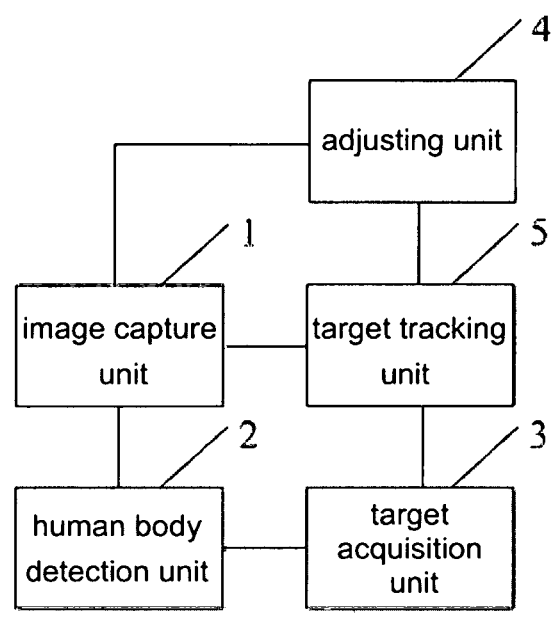
FIG. 1 is a structure diagram of the system according to the invention.
Figure 2:
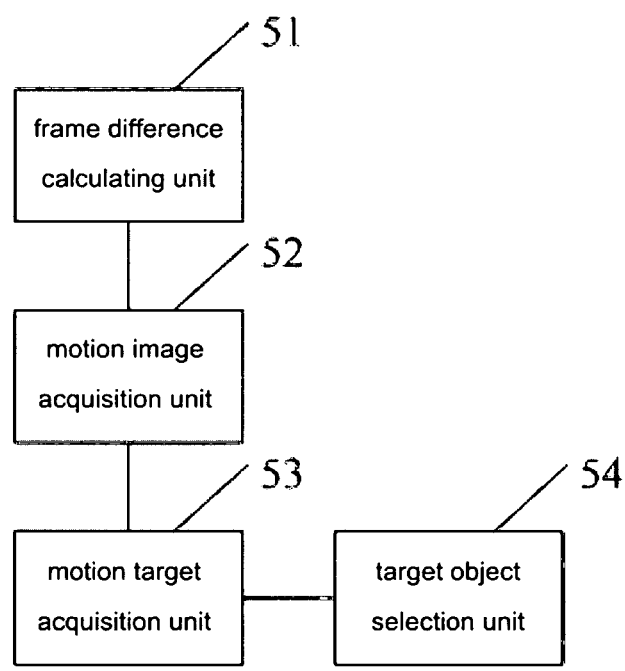
FIG. 2 is a structure diagram of the target tracking unit according to the invention.
Figure 3:
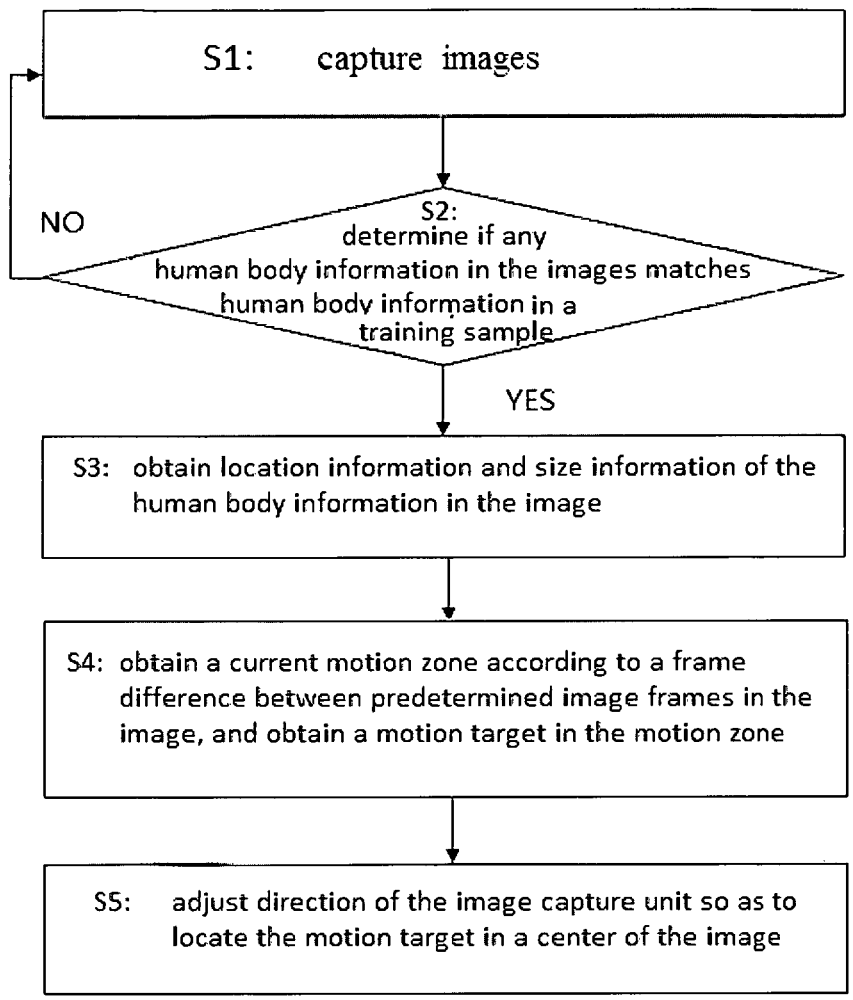
FIG. 3 is a flow diagram of the method according to the invention.

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the term "plurality" means a number greater than one.

Hereinafter, certain exemplary embodiments according to the present disclosure will be described with reference to the accompanying drawings.

Referring to FIG. 1, a robot monitoring system based on human body information comprises:

an image capture unit 1, configured to capture images;

a human body detection unit 2, connected with the image capture unit 1, and configured to determine if any human body information in the images matches with human body information in a training sample;

a target acquisition unit 3, connected with the human body detection unit 2, and configured to get location information and size information of the human body information in the image;

a target tracking unit 5, connected with the image capture unit 1 and the target acquisition unit 3, and configured to obtain a current motion zone according to a frame difference between predetermined image frames in the image, and to obtain a motion target in the motion zone;

an adjusting unit 4, connected with the target tracking unit 5 and the image capture unit 1, and configured to adjust direction of the image capture unit 1 so as to locate the motion target in a center of the image.

In a preferred embodiment, in the robot monitoring system based on human body information, the target tracking unit 5 comprises:

a frame difference calculating unit 51, configured to compute obtained image information of the (n+2)th frame, the (n−1)th frame and the (n)th frame, so as to obtain the frame difference between pixel gray scales of the (n−1)th frame and that of the (n+2)th frame as the first difference image and to obtain the frame difference between pixel gray scales of the (n)th frame and that of the (n−2)th frame as the second difference image;

a motion image acquisition unit 52, connected with the frame difference calculating unit 51, and configured to obtain a current motion image according to the first difference image and the second difference image;

a motion target acquisition unit 53, connected with the motion image acquisition unit 52, and configured to obtain a set of points which meet setting conditions in the motion image, and to obtain the motion target according to the set of points.

In a preferred embodiment, in the robot monitoring system based on human body information, the adjusting unit 4 comprises: a judgment unit, configured to judge the distance between the motion target and the center of the image, so as to produce an adjusting signal if the distance is greater than a given threshold.

In a preferred embodiment, the robot monitoring system based on human body information further comprises a storage unit, connected with the image capture unit 1, and configured to store the images.

In a preferred embodiment, in the robot monitoring system based on human body information, the human body information is human face information.

The invention also provides a robot monitoring method based on human body information, wherein it comprises steps as follows:

S1: capture images;

S2: determine if any human body information in the images matches human body information in a training sample, if NO, repeat S1;

S3: obtain location information and size information of the human body information in the image;

S4: obtain a current motion zone according to a frame difference between predetermined image frames in the image, and obtain a motion target in the motion zone;

S5: adjust direction of the image capture unit so as to locate the motion target in a center of the image.

For overcoming the defects of image acquisition device for monitoring 24 hours a day in a single angle of view in the prior art, the present invention uses detection of human body information, to track the user as soon as human body information is detected, so that the monitoring center tracks the location of the human body all the time, and locating and tracking human body are effectively achieved, for monitoring contents information that users are interested in.

In a preferred embodiment, in the robot monitoring method based on human body information, S4 specifically includes:

S41: compute obtained image information of the (n+2)th frame, the (n−1)th frame and the (n)th frame, so as to obtain a frame difference between pixel gray scales of (n−1)th frame and that of the (n+2)th frame as the first difference image and obtain the frame difference between pixel gray scales of the (n)th frame and that of the (n−2)th frame as the second difference image;

S42: obtain a current motion image according to the first difference image and the second difference image;

S43: obtain a set of points which meet setting conditions in the motion image, wherein each point represents a motion unit, and find all interconnected motion units as suspected motion targets;

S44: compute motion intensity value of each suspected motion target, wherein the motion intensity value equals to the number of the motion units divided by the rectangular area of the suspected motion targets, and obtain all the effective motion targets at current time point according to the motion intensity value and the rectangular area of the suspected motion targets;

S45: select a rectangle frame closest to the target object from the effective motion targets as the motion target.

One specific embodiment of the target tracking method is that: using the location information and the size information obtained in S3 to initialize the location information as track start information; then the frame difference method is used: firstly, obtain the image information collected in a current image frame and previous two image frames, obtain the first difference image (img1) by subtracting the third image frame from the first image frame, obtain the second difference image (img2) by subtracting the third image frame from the second image frame, and obtain the motion image (motionmap) by overlaying the first difference image (img1) and the second difference image (img2); secondly, every point not equaling to 0 in the motion image (motionmap) represents a motion unit, find all interconnected motion units, and these interconnected motion units constitute a suspected motion target (simobjs); at last, compute the motion intensity value (dev) of all suspected motion target, wherein the motion intensity value (dev)=number of the motion units/rectangular area of the suspected motion targets, and the bigger motion intensity value means the more motion information in this area, while the smaller motion intensity value means the less motion information in this area. In addition, if the rectangular area of the suspected motion target is less than a given threshold, this area will not be considered as a motion zone and be excluded; at this point, all the effective motion targets (objs) at current time point are obtained, and a (objs) rectangle frame closest to the target object is selected from the targets, then repeat S1.

S5 specifically includes steps as follows: analyze and judge whether the motion target (obj) is located at the center of the image; if the distance between the motion target (obj) and the center of the image is greater than a certain distance, robots will adjust same distance towards moving direction of the target object to keep the center of the target object at the center of the image all the time.

In a preferred embodiment, in the robot monitoring method based on human body information, the training sample is obtained by pre-training prior to S1.

If it is determined that human body information in obtained images matches that in a training sample, location information and size information of the human body information in the image will be further obtained; if not, detection of the human body information will be continued.

In a preferred embodiment, in the robot monitoring method based on human body information, when the steps from S1 to S4 loops for a certain period of time, a video, in a time period from the first time that YES occurs in S2 to the last time that NO occurs in S2, will be selected and transmitted to a monitoring storage center.

Specifically, if the abovementioned steps repeats for a certain period of time, it is believed that human motion information exists in this time point; then the time point that YES occurs in S2 for the first time and another time point that NO occurs in S2 for the last time will be selected respectively, and a video, of a time period started from 5 s~10 s before the time point that YES occurs in S2 for the first time and ended 5 s~10 s after time point that NO occurs in S2 for the last time, would be saved and transmitted to a monitoring storage center.

Furthermore, in another alternative solution, detection of motion information is utilized to determine whether current status needs to record the monitoring video.

In a preferred embodiment, in the robot monitoring method based on human body information, the human body information is human face information.

As described above, the present technical solution can be used for home service intelligent robots, which detect the human body information and track, so as to determine if the time point is appropriate for monitoring record; the present technical solution can also be used for outdoor surveillance camera manufacturers, the robot monitoring system not only records information during 24 hours a day, but also notify a user a surveillance video clips he or she may interest.

The foregoing is only the preferred embodiments of the invention, not thus limiting embodiments and scope of the invention, those skilled in the art should be able to realize that the schemes obtained from the content of specification and figures of the invention are within the scope of the invention.

What is claimed is:

1. A robot monitoring system based on human body information, comprising:
   an image capture unit, configured to capture images;
   a human body detection unit, connected with the image capture unit, and configured to determine if any human body information in the images matches with human body information in a training sample;

a target acquisition unit, connected with the human body detection unit, and configured to get location information and size information of the human body information in the image;

a target tracking unit, connected with the image capture unit and the target acquisition unit, and configured to obtain a current motion zone according to a frame difference between predetermined image frames in the image, and to obtain a motion target in the motion zone;

an adjusting unit, connected with the target tracking unit and the image capture unit, and configured to adjust direction of the image capture unit so as to locate the motion target in a center of the image;

wherein the target tracking unit comprises:

a frame difference calculating unit, configured to compute obtained image information of a (n+2)th frame, a (n−1)th frame and a (n)th frame, so as to obtain a frame difference between pixel gray scales of the (n−1) frame and that of the (n+2) frame as a first difference image and to obtain a frame difference between pixel gray scales of the (n)th frame and that of the (n−2)th frame as a second difference image;

a motion image acquisition unit, connected with the frame difference calculating unit, and configured to obtain a current motion image according to the first difference image and the second difference image; and a motion target acquisition unit, connected with the motion image acquisition unit, and configured to obtain a set of points which meet setting conditions in the motion image, and to obtain the motion target according to the set of points.

2. The robot monitoring system based on human body information according to claim 1, wherein the adjusting unit comprises:

a judgment unit, configured to judge a distance between the motion target and a center of the image, so as to produce an adjusting signal if the distance is greater than a given threshold.

3. The robot monitoring system based on human body information according to claim 1, further comprising a storage unit, connected with the image capture unit and configured to store the images.

4. The robot monitoring system based on human body information according to claim 1, wherein the human body information is human face information.

5. A robot monitoring method based on human body information, wherein comprising steps as follows:

S1: capture images;

S2: determine if any human body information in the images matches human body information in a training sample, if NO, repeat S1;

S3: obtain location information and size information of the human body information in the image;

S4: obtain a current motion zone according to a frame difference between predetermined image frames in the image, and obtain a motion target in the motion zone;

S5: adjust direction of the image capture unit so as to locate the motion target in a center of the image;

wherein S4 includes:

S41: compute obtained image information of the (n+2)th frame, the (n−1)th frame and the (n)th frame, so as to obtain a frame difference between pixel gray scales of the (n−1)th frame and that of the (n+2)th frame as a first difference image and obtain a frame difference between pixel gray scales of the (n)th frame and that of the (n−2)th frame as a second difference image;

S42: obtain a current motion image according to the first difference image and the second difference image;

S43: obtain a set of points which meet setting conditions in the motion image, wherein each point represents a motion unit, and find all interconnected motion units as suspected motion targets;

S44: compute motion intensity value of each suspected motion target, wherein the motion intensity value equals to a number of the motion units divided by rectangular area of the suspected motion targets, and obtain all effective motion targets at current time point according to the motion intensity value and the rectangular area of the suspected motion targets;

S45: select a rectangle frame closest to the target object from the effective motion targets as the motion target.

6. The robot monitoring method based on human body information according to claim 5, wherein the training sample is obtained by pre-training prior to S1.

7. The robot monitoring method based on human body information according to claim 5, wherein, when the steps from S1 to S4 loops for a certain period of time, a video, in a time period from the first time that YES occurs in S2 to the last time that NO occurs in S2, will be selected and transmitted to a monitoring storage center.

8. The robot monitoring method based on human body information according to claim 5, wherein the human body information is human face information.

* * * * *